Sept. 28, 1943.　　　H. W. UHLRIG　　　2,330,644
TOASTER
Filed Sept. 26, 1940
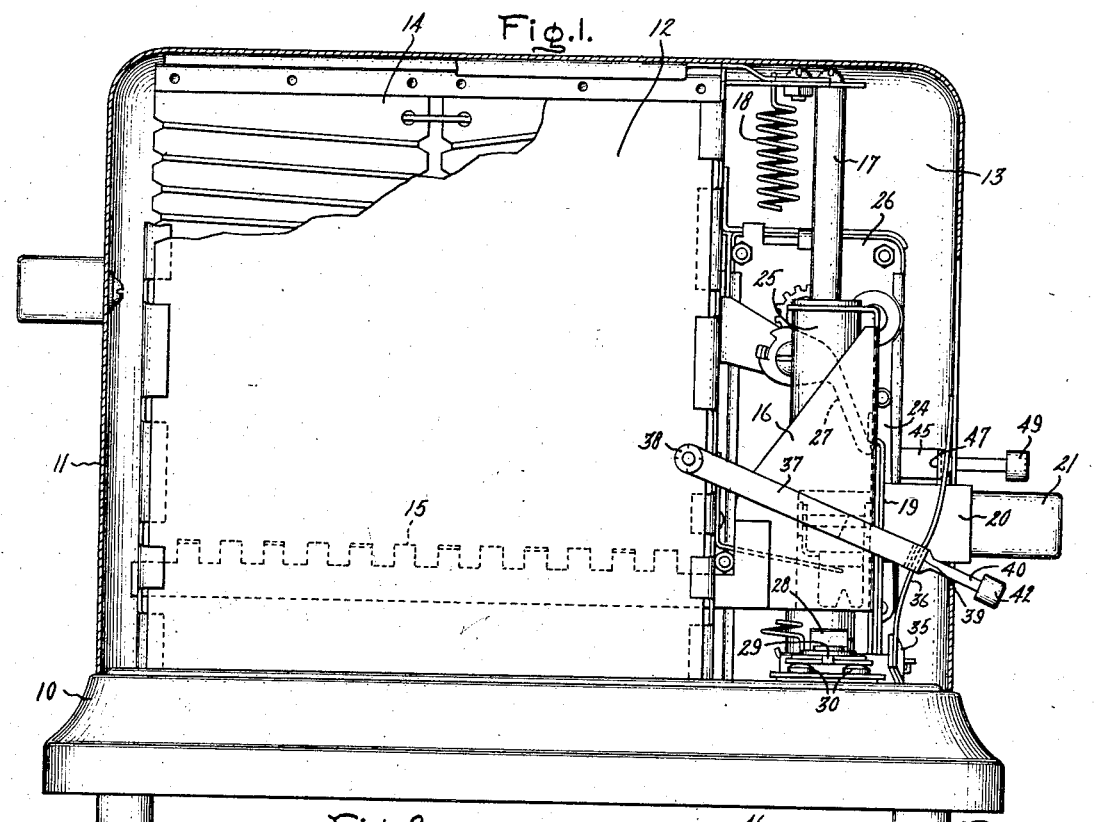
Inventor:
Harry W. Uhlrig.
by Harry E. Dunham
His Attorney.

Patented Sept. 28, 1943

2,330,644

UNITED STATES PATENT OFFICE 2,330,644

TOASTER

Harry W. Uhlrig, Stratford, Conn., assignor to General Electric Company, a corporation of New York Application September 26, 1940, Serial No. 358,488

4 Claims. (Cl. 219—19)

This invention relates to toasters and more particularly to electrically heated bread toasters and has for its object the provision of an improved device of this character.

This invention is particularly applicable to automatic bread toasters in which a timing mechanism is used to measure the toasting interval and cause the deenergization of the heating means of the toaster and the ejection of the toasted bread from the heating chamber at the proper time. In automatic toasters of this type it is customary to provide a bread carriage which supports the bread to be toasted within the oven compartment of the toaster. When the carriage is in the toasting position the bread being toasted is located entirely within the oven compartment so that its entire surface is cooked. At the end of the cooking interval when the heating means is turned off, the bread carriage and the toast mounted thereon are automatically moved to a non-toasting position so that a substantial portion of the bread slice extends outside of the oven compartment. When in this position, the bread slice is subjected to the cooling effect of the surrounding air and if it is not immediately used it will quickly become cold.

Many persons desire their toast to be as warm as possible at the time it is used. With automatic toasters this requires a careful gauging of the cooking operation so that the toast will be cooked just when it is needed in order to prevent undesirable cooling as described above.

In accordance with this invention I have provided improved means for use with an automatic toaster whereby at the end of the toasting interval the toasted bread may at the will of the operator be kept within the oven compartment and maintained warm by the residual heat of this compartment.

In accordance with one specific embodiment of this invention, I have provided in an automatic toaster primary latching means for holding the bread slice-holder in its toasting position. A timing mechanism releases this latching means at the end of the toasting period to permit the holder to move to a non-toasting position.

A secondary latch is provided by means of which the travel of the bread slice-holder toward its non-toasting position at the end of the timed toasting interval may be limited at a point sufficient to keep the toast within the toaster compartment. This secondary latch arrangement is manually operable so that the operator may at will move the latch either into or out of the path of the bread slice-holder to obtain the aforedescribed operation.

In addition to the foregoing, I have provided an improved toaster arrangement which is simple in construction and pleasing in appearance and by which the aforementioned warming function may be obtained simply and at a low cost.

For a more complete understanding of this invention, reference should be had to the accompanying drawing in which Fig. 1 is a side elevation of an electric toaster embodying my invention, parts being shown in section and parts broken away so as to illustrate certain details of the invention covered by this application; Fig. 2 is an end view of the mechanism compartment shown at the right-hand end of Fig. 1, the toaster casing and the operating handle for the mechanism being removed to show additional details of my improved construction; and Fig. 3 is an enlarged fragmentary plan view of the mechanism compartment of the toaster, parts being removed to show further details of the new and improved latching means shown in Figs. 1 and 2.

Referring to the drawing, this invention has been shown in one form as applied to an electric toaster of the automatic type in which the toasted slice is ejected at the end of a predetermined interval of time. In the particular embodiment of my invention illustrated, I have shown my invention applied to an automatic toaster of the type described and claimed in my copending application Serial No. 295,067, filed September 15, 1939, now Patent No. 2,241,103, dated May 6, 1941, and which is assigned to the assignee of this application. As is more fully described in my copending application, the toaster comprises a base 10 upon which is supported a casing 11 which is divided into a toasting compartment 12 and a mechanism compartment 13. The toaster illustrated is of the two-slice type; hence the toasting compartment is divided into a pair of toasting chambers. Each of these chambers is provided with suitable heating elements 14 for performing the toasting operation and each is provided with a vertically moving bread carrying rack 15.

Contained within the mechanism compartment is a suitable mechanism by which the bread carrying rack 15 may be moved downwardly manually to the toasting position in the toasting chamber shown in dotted line in Fig. 1 and may be moved upwardly automatically to the non-toasting position at the end of the toasting interval so as to eject the toasted bread from the toasting chamber. This mechanism is completely described in my aforementioned copending application and reference should be had to this application for a full description thereof. Briefly, however, the mechanism comprises a carriage 16 to which the bread carrying racks 15 are secured and which is adapted to move up and down along the rod 17, a spring 18 being provided to bias the carriage and the racks 15 connected thereto to the upward or non-toasting position. Pivotally mounted on the carriage 16 so that it can move outwardly a limited amount relative to the carriage for a reason which will appear more fully hereinafter is a handle bracket 19 which is provided with an outwardly extending flange 20 to which is secured a handle 21. As shown in Fig. 1, the handle 21 is arranged so as to be manually operated from outside the casing 11. Secured to the lower end of the handle bracket 19 so as to have one end fixed and its opposite end free to move is a resilient latch bar 22 which is adapted to snap under a catch 23 so as to latch the carriage and the bread carrying racks secured thereto in their lower or toasting position against the biasing force of spring 18. The catch 23 is integrally formed on the pivotally formed lever 24 and means are provided for moving the lever 24 to release the latch bar 22 at the end of a predetermined toasting interval so as to permit the carriage and the racks connected thereto to be moved upwardly by the spring 18 to the non-toasting position, this upward movement being damped by suitable dash pot damping means 25. The means for releasing the latch may be either a thermal timer mechanism or a clock type timer mechanism. In the form shown, a spring wound type of clock mechanism 26 is employed. As described in more detail in my above mentioned copending application, the clock mechanism includes a winding rack 26a which is detachably connected to the carrier 16 so that when the carrier is depressed the clock is wound, but when the carrier is in the toasting position the connection between the rack and carrier is broken to permit the rack to be moved upwardly by the clock. After a predetermined interval a portion of the rack will engage a cam 27 causing it to move the lever 24 and trip the latch.

Secured to the lower portion of the carriage 16 is a suitable resilient contact arm 28 carrying a bridging contact 29 which is adapted to bridge a pair of fixed contacts 30 mounted on the bottom wall of the mechanism compartment. It will be understood that when the bridging contact is in engagement with the pair of fixed contacts the heating elements 15 of the toasting compartment will be energized. The bridging contact 29 is mounted so that just before the carriage is latched in the toasting position it engages the fixed contacts 30 and just after the latch is released to start the upward movement of the carriage it moves out of engagement with the fixed contacts 30.

In accordance with this invention I have provided new and improved means which are manually operable at the will of the operator so as to limit the automatic upward travel of the carriage 16 to an amount sufficient to cause the bread carried by the rack 15 to be maintained in the toasting compartment and thereby be kept warm. As described above, the release and upward travel of the carriage 16 also effects a complete deenergization of the heating elements 14 within the toasting compartments. My improved latch means for limiting the upward travel of the carriage is so positioned that the carriage will travel upwardly an amount sufficient to cause the deenergization of the heating element so that substantially no further toasting will result but the toast will be kept warm by the residual heat within the compartment.

Referring now to the specific embodiment of my invention shown in the drawing and particularly to Figs. 2 and 3, it will be observed that I have provided a secondary latch arrangement which comprises a lever 31 which is pivotally mounted at 32 on the bottom wall of the mechanism compartment 13. Integrally formed on one end of this lever—the top end as viewed in Fig. 3—is an upwardly projecting arm 33 upon which is supported a catch 34. The catch 34 is shaped so that when it is in its operative position it will engage the free end of the latch bar 22 so as to limit further upward movement of the carriage 16 and the bread carrying racks 15 connected thereto. The length of the arm 33 determines the point at which the free movement of carriage 16 will be limited by the catch 34. In the preferred form of this invention, this arm is made sufficiently long so that the carriage will be moved upwardly an amount sufficient to cause the bridging contact 29 to be moved out of engagement with the fixed contacts 30 thereby to open the heating circuit of the heating elements 14 but not an amount sufficient to cause any portion of the toast mounted on the rack 15 to be moved out of the toasting compartment.

As previously stated, the lever 31 is pivotally mounted on the bottom wall of the mechanism compartment. This pivotal mounting is provided so that the catch 34 may be manually moved at the will of the operator from a non-latching to a latching position or vice versa. In Fig. 3 the latching position is shown in full lines and the non-latching position is shown in dotted lines. In order to effect this manual movement of the lever 31, there is integrally formed on the left-hand end of this lever as viewed in Fig. 2, an outwardly extending bracket 35. Secured to the end of the bracket 35 is an upwardly extending resilient arm 36. Cooperating with the resilient arm 36 so that the lever 31 may be pivoted either clockwise or counterclockwise about the pivot point 32 is a hand operated lever 37 which is pivotally mounted on the side wall of the toasting compartment at 38. The lever 37 is provided with an offset portion 39 and projecting outwardly from the offset portion is a handle portion 40 which projects through a vertical slot 41 provided in the front wall of the casing 11 so as to receive a knob 42. Secured to the lever adjacent the offset portion is an L-shaped bracket 43 having a leg portion 44 which extends parallel to the offset portion of the lever so as to define a slot in which the resilient arm 36 is adapted to be inserted and to track. The lever 37 is arranged so that when it is in the downward position, the catch 34 will lie in the path of the latching bar 22 so as to limit the upward movement of the carriage 16. When the lever 37 is in the upward position, the lever 31 will have been rotated in a counterclockwise direction about the pivot 32 to move the latch 34 out of the path of the latch bar 22 thus permitting the bread carrying racks 15 to be moved upwardly and cause the toast to be ejected from the toaster.

As stated above, the arm 36 is made of some suitable resilient material. By thus constructing the arm, it serves not only as the motion transmitting means between the lever 37 and the lever 31 but it also flexes, as shown in Fig. 1, when the lever 37 is moved downward and serves as a biasing spring for the catch 34.

As described in my above mentioned copending application, means are provided for varying the toasting interval as measured by the clock mechanism 26. In order to balance the design of the front of the toaster casing, I have provided operating means for the time adjusting means in the form of a lever 45 which is pivotally mounted at 46 to the right-hand wall of the toaster compartment as viewed in Fig. 2 and as shown more clearly in Fig. 3. This lever 45 is similar to the lever 37 and is provided with a portion 47 which is adapted to project outwardly through a vertical slot 48 provided in the toaster casing and to receive a knob 49. The lever 45 is connected to the clockwork mechanism so that when it is moved downwardly the toasting interval is shortened. It will be observed that by this construction the front of the toaster casing presents a balanced design and a uniform appearance; the knob 42 for the lever 37 lying on one side of the main operating handle 21 and the knob 49 for the lever 45 lying at the opposite side of the handle 19, both knobs being spaced about the same distance from the side wall of the casing 11.

In the operation of my improved toaster arrangement, the operator places the bread slices to be toasted on the racks 15 and presses downwardly on the lever 21 until the latch bar 22 moves under the latch 23. This moves the bread to the toasting position and, as described above, causes the bridging contact 29 to engage the fixed contacts 30 to connect the heating elements 14 to a suitable source of supply (not shown). As described more fully in my above mentioned copending application, the downward movement of the handle 19 causes the clockwork mechanism 26 to be wound and when the handle 21 is released the timer begins to measure the toasting interval. If now the operator desires the toast to remain in the toaster compartment at the end of the toasting interval so as to be kept warm, the lever 37 is moved downwardly to the position shown in Fig. 2. This causes the pivoted lever 31 to be pivoted in the clockwise direction so that the catch 34 is moved into the path of the latch bar 22. At the end of the toasting interval, the latch 23 will be automatically released and the carriage 16 will move upwardly under the force exerted by the spring 18. With the latch 34 in the position indicated, however, this upward movement is limited by the engagement of the latch bar 22 with the catch 34. As previously described, sufficient upward movement is permitted the carriage 16 to allow the bridging contact 29 to move out of engagement with the fixed contacts 30 so that the energizing circuit of the heating element 14 is opened. The toast will then be maintained within the toaster compartment and will be kept warm by the residual heat within this compartment. When the operator desires to use the toast thus cooked and kept warm, she moves the handle 21 upwardly a slight amount so that the handle plate 19 pivots relative to the carriage 16. This pivotal movement is sufficient to permit the latch bar 22 to move out of engagement with the latch 34. The carriage and bread carrying racks secured thereto are then free to move upwardly in the usual manner so as to eject the toast.

As long as the lever 37 is in the lower position shown in Fig. 2, the latch 34 will be maintained in the path of the latch bar 22 and each successive slice of toast cooked in the toaster will be maintained in the toasting compartment until manually released in the manner described above. When it is desired to return to the automatic ejection of the toast after completion of the toasting interval, the lever 37 will be moved upwardly so as to cause the lever 31 to be pivoted in a counterclockwise direction to move the catch 34 out of the path of the latch bar 22.

From the foregoing it will be apparent that I have provided new, improved and simplified means which can be manufactured at low cost for preventing the automatic ejection of toast at the end of the toasting interval in an automatic type of toaster whereby the toast may be maintained within the toasting compartment and kept warm by the residual heat within this compartment.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A toaster comprising a toasting chamber, heating means in said chamber for performing a toasting function, a slice-holder in said chamber, a vertically movable carriage attached to said holder for moving said holder between a toasting and non-toasting position, means biasing said holder and said carriage to their non-toasting position, a catch member, a latching bar secured to said carriage and adapted to engage said catch member so as to latch said holder and carriage in their toasting position, switch means for controlling said heating means, means for actuating said switch means to the circuit closing position when said carriage is moved to its toasting position, timing means for measuring the toasting interval, means actuated by said timing means for moving said catch member so that said holder and carriage are moved by said biasing means to the non-toasting position at the end of the toasting interval, a secondary catch member adapted to be engaged by said latching bar to limit the upward movement of said carriage after the operation of said first mentioned catch member, means for supporting said secondary catch member so that it can be moved to the latching or non-latching position, manual means for actuating said supporting means so that it may be moved to either its latching or non-latching position at the will of the operator, and means for moving said latching bar so as to release it from said secondary catch member to permit said slice-holder and carriage to move to their non-toasting position.

2. A toaster comprising a casing defining a toasting chamber, heating means in said chamber for performing a toasting function, a slice-holder in said chamber vertically movable between a toasting and a non-toasting position, means biasing said holder to its non-toasting position, a catch member, a latching bar secured to said holder and adapted to engage said catch member so as to latch said holder in its toasting position, switch means for controlling said heating means, means for actuating said switch means to the circuit closing position when said holder is moved to its toasting position, timing means for measuring the toasting interval, means actuated by said timing means for moving said catch member so that said holder is moved by said biasing means to the non-toasting position at the end of the toasting interval, a pivotally mounted secondary latching member spaced above said first mentioned latching member so as to limit the upward movement of said holder to its non-toasting position, means operable from outside of said casing for moving said secondary latching member into or out of the path of said latching bar so that the toast may be automatically ejected from or maintained within said toasting chamber at the will of the operator, and means for manually moving said latching bar from engagement with said secondary latching means so as to permit the toast to be ejected from the toasting chamber when desired.

3. A toaster comprising a casing defining a toasting chamber, heating means in said chamber for performing a toasting function, a slice-holder in said chamber, a vertically movable carriage attached to said holder for moving said holder between a toasting and non-toasting position, means biasing said holder and said carriage to their non-toasting position, a catch member, a latch member secured to said carriage and adapted to engage said catch member so as to latch said holder and carriage in their toasting position, switch means for controlling said heating means, means for actuating said switch means to the circuit closing position when said carriage is moved to its toasting position, timing means for measuring the toasting interval, means actuated by said timing means for moving said catch member to release said latch member so that said holder and carriage are moved by said biasing means to the non-toasting position at the end of the toasting interval, a secondary catch member constructed and arranged to engage said latch member so that after the operation of said first mentioned catch member the movement of said holder and carriage to their non-toasting position is limited an amount sufficient to move said switch means to the open circuit position, a pivoted lever for supporting said secondary catch member, a resilient arm secured to said pivoted lever, a second lever pivotally mounted on said toasting chamber and having a portion extending outside of said casing, and means for loosely connecting said second lever to said resilient arm so that said second lever may be moved relative to said arm, said relative movement producing a pivotal movement of said first mentioned lever so that said secondary catch member may be moved into or out of the path of said latch member to maintain the toast in said toasting compartment at the will of the operator.

4. A toaster comprising a casing defining a toasting chamber, heating means in said chamber for performing a toasting function, a slice-holder in said chamber, a vertically movable carriage attached to said holder for moving said holder between a toasting and non-toasting position, means biasing said holder and said carriage to their non-toasting position, a catch member, a latch member secured to said carriage and adapted to engage said catch member so as to latch said holder and carriage in their toasting position, switch means for controlling said heating means, means for actuating said switch means to the circuit closing position when said carriage is moved to its toasting position, timing means for measuring the toasting interval, means actuated by said timing means for moving said catch member so that said holder and carriage are moved by said biasing means to the non-toasting position at the end of the toasting interval, a secondary catch member constructed and arranged to engage said latch member so that after the operation of said first mentioned catch member the movement of said holder and carriage to their non-toasting position is limited an amount sufficient to move said switch means to the open circuit position, a pivoted lever for supporting said secondary catch member, a second pivoted lever movable in a substantially vertical plane and having a portion extending outside of said chamber, means for converting the vertical movement of said second lever to a pivotal movement of said first lever so that said secondary catch member may be moved into or out of the path of said latching bar, said means comprising a resilient arm secured to said first mentioned pivoted lever and means on said second mentioned lever defining a slot for receiving said resilient arm.

HARRY W. UHLRIG.